United States Patent [19]

Matsumura et al.

[11] Patent Number: 4,961,410

[45] Date of Patent: Oct. 9, 1990

[54] CRANK ANGLE DETECTING DEVICE FOR A MULTI-CYLINDER INTERNAL COMBUSTION ENGINE

[75] Inventors: Masami Matsumura; Masahiro Hayashi; Atsushi Ueda, all of Himeji, Japan

[73] Assignee: Mitsubishi Denki Kabushiki Kaisha, Tokyo, Japan

[21] Appl. No.: 324,888

[22] Filed: Mar. 17, 1989

[30] Foreign Application Priority Data

Mar. 18, 1988 [JP] Japan .................................. 63-63430

[51] Int. Cl.$^5$ ................................................ F02P 7/06
[52] U.S. Cl. ..................................... 123/414; 123/643
[58] Field of Search ............... 123/476, 490, 414, 617, 123/643; 73/116

[56] References Cited

U.S. PATENT DOCUMENTS

| | | | |
|---|---|---|---|
| 4,656,993 | 4/1987 | Yuzawa et al. | 123/414 X |
| 4,766,865 | 8/1988 | Hartel | 123/414 |
| 4,827,886 | 5/1989 | Maeda | 123/414 |

FOREIGN PATENT DOCUMENTS

| | | | |
|---|---|---|---|
| 23239 | 2/1983 | Japan | 123/414 |
| 62176 | 4/1983 | Japan . | |

Primary Examiner—Tony M. Argenbright
Attorney, Agent, or Firm—Sughrue, Mion, Zinn, Macpeak and Seas

[57] ABSTRACT

A crank angle detector includes a first generator 2 for sequentially generating a first signal including a plurality of first pulses corresponding to the number of engine cylinders in two crankshaft revolutions, and a second generator 3 for generating a second signal in two revolutions including a plurality of groups of second pulses, each group of second pulses having a condition which corresponds to a specific period of the first signal and which is different from those of the other groups. A cylinder discriminator 4 is connected to the first and second generators for discriminating the operating strokes of the respective cylinders by detecting a specific pulse condition of the second signal which occurs within a specific period of the first signal. In a preferred embodiment, each of the second pulses has a width less than that of each pulse of the first signal, and each group of second pulses has a total sum of rising and falling edges which is different from that of each of the other groups. Preferably, the crank angle signal has a period in which the first signal is alternatively at a low level or at a high level.

11 Claims, 6 Drawing Sheets

One typical example of such a crank angle detecting

CRANK ANGLE DETECTING DEVICE FOR A MULTI-CYLINDER INTERNAL COMBUSTION ENGINE

BACKGROUND OF THE INVENTION

1. Field of the Invention

The present invention relates to a crank angle detecting device for a multi-cylinder internal combustion engine which is able to discriminate the operating states of the cylinders with the least possible revolution of an engine crankshaft during the starting of the engine.

2. Description of the Related Art

Conventionally, various kinds of controls on engine operations such as fuel injection control, ignition timing control, etc., are generally performed on multi-cylinder internal combustion engines by discriminating the operating states of respective cylinders in combination with crank angle. To this end, crank angle detecting devices have been widely employed.

One typical example of such a crank angle detecting device includes a crank angle sensor which generates a first signal in the form of a crank angle signal SGT representative of the crank angle of a common crankshaft, and a second signal in the form of a cylinder discrimination signal SGC used for discriminating specific operating states of the respective cylinders.

Figure 7A:
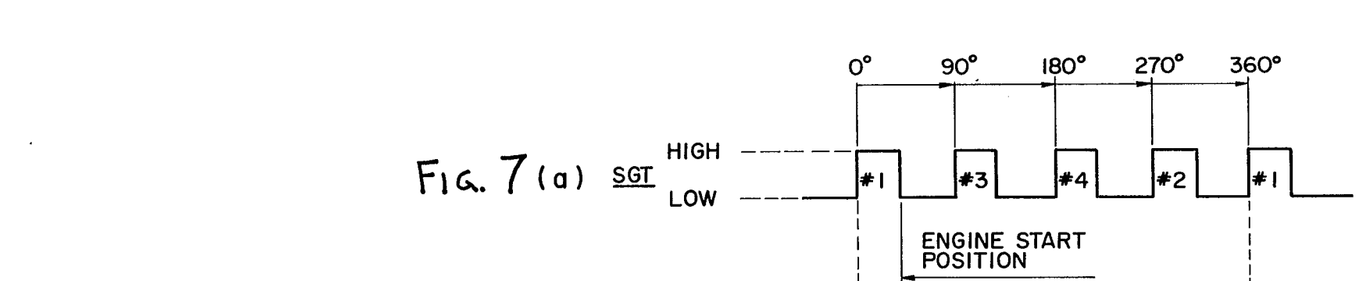
FIGS. 7(a) and 7(b) are views similar to FIG. 3, but showing the wave forms of first and second signals according to a conventional crank angle detecting device.
Figure 7B:
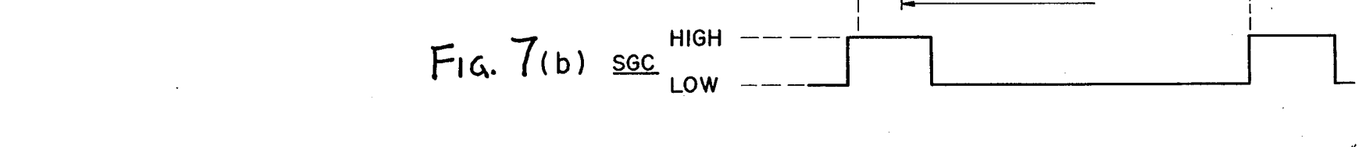

FIGS. 7(a) and 7(b) show a typical example of such signals for use with a four-cylinder internal combustion engine. FIG. 7(a) s a crank angle signal SGT which is representative of the crank angle of the common crankshaft of a four-cylinder engine. The crank angle signal SGT comprises four rectangular-shaped pulses which correspond in number to the cylinders of the engine and which are generated regularly by a crank angle sensor at predetermined crank angles (i.e., 0, 90, 180 and 270 degrees) or at predetermined angular intervals (i.e., 90 degrees). That is, the crank angle sensor generates four SGT pulses per revolution of a camshaft which is operatively connected with the crankshaft in such a manner that it makes one revolution per two crankshaft revolutions, at equally spaced angular intervals. On the other hand, FIG. 7(b) is a cylinder discrimination signals SGC which serves, in combination with the crank angle signal SGT, to discriminate respective cylinders, i.e., determine which cylinder is in a predetermined operating state or stroke. The SGC signal comprises a single rectangular-shaped pulse which has a pulse width greater than that of a SGT signal pulse and which is generated by the crank angle sensor per revolution of the camshaft (i.e., two revolutions of the crankshaft) at a timing corresponding to a predetermined operating state or stroke of a specific cylinder (e.g., the explosion stroke of a first cylinder #1 in this example).

According to this example, discrimination of the respective cylinders is made as follows. First, an unillustrated crank angle sensor generates the SGT signal and the SGC signal which are inputted to an unillustrated control means wherein it is determined whether or not the SGC signal is at a high lever when the SGT signal is high. If it is "YES", then the control means determines that the predetermined cylinder (i.e., the first cylinder #1) is on the specified operating state (i.e., explosion stroke). Based on this determination, the respective operating states or strokes of the remaining cylinders are subsequently discriminated since the operational sequence of all the cylinders is predetermined. Accordingly, substantially one revolution (i.e., 360 degrees) of the camshaft (i.e., two revolutions of the crankshaft), is required at maximum for discriminating the operating states of the respective cylinders.

Figure 8A:
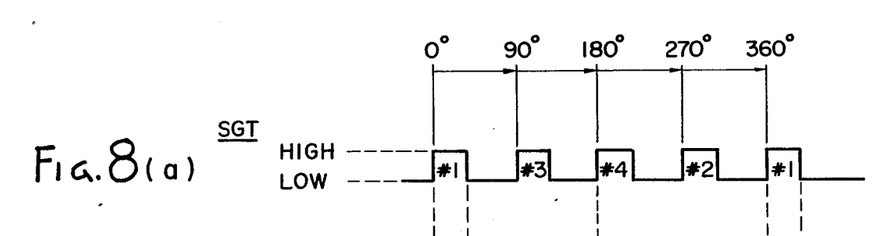
FIGS. 8(a) and 8(b) are views similar to FIG. 1, but showing the wave forms of first and second signals according to another conventional crank angle detecting device.
Figure 8B:
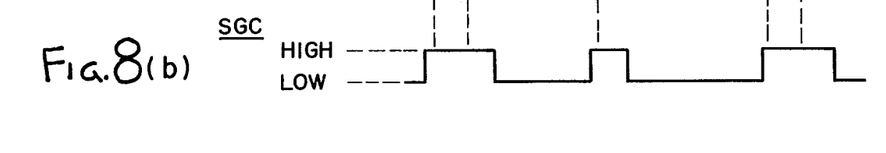

FIGS. 8(a) and 8(b) show another example of an SGT signal and an SGC signal generated by a conventional crank angle sensor for use with a four-cylinder internal combustion engine. In this example, the SGT signal is the same as that of FIG. 7(a) but the SGC signal is different from that of FIG. 7(b). Specifically, the SGC signal in this example includes two kinds of rectangular-shaped pulses within one revolution of a camshaft. One of them has a pulse width greater than that of the other, and these pulses are generated regularly by a crank angle sensor at an interval of 180 degrees or at predetermined crank angles (i.e., 0 and 180 degrees). The SGT signal and the SGC signal are inputted to an unillustrated control means wherein it is determined how many rising and falling edges of the SGT signal occurred during the time when the SGC signal is at the high level. If the number of rising and falling edges counted during the high level of the SGC is two, it is then recognized that a specific one (e.g. the first cylinder #1 in this example) of the four cylinders is on a specific operating state (e.g. explosion stroke). On the other hand, if the number counted is one, it is recognized that another specific cylinder (e.g. the fourth cylinder #4 in this example) is on a specific operating state (e.g. explosion stroke). Accordingly, based on the discriminated one of the cylinders, the respective operating states of the remaining cylinders can be subsequently discriminated in the same way as in the case of FIG. 7. Thus, substantially halt a revolution of the camshaft (360 degrees of crank angle) at maximum is required to discriminate the respective operating states of the cylinders.

In the above described conventional crank angle detecting devices, however, it is difficult to discriminate the operating states of the respective cylinders in a period of time shorter than about half a revolution of the camshaft. As a result, the conventional devices cannot meet recent demands that discrimination of the operating states of the cylinders in a multi-cylinder engine be performed in as short a time as possible, for example, within one third or fourth of one revolution or even less in order to improve engine operation such as the startability of an engine.

SUMMARY OF THE INVENTION

In view of the above, the present invention is intended to obviate the above-described problems of the prior art.

An object of the present invention is to provide a crank angle detecting device for a multi-cylinder internal combustion engine which can perform the discrimination of the respective operationing states of respective cylinders in a time much shorter than that required in conventional devices.

Bearing the above object in view, the present invention resides in a crank angle detecting device for a multi-cylinder internal combustion engine for detecting the operating states of respective cylinders having a common crankshaft, the device comprising:

a first signal generating means for generating within two revolutions of the crankshaft a first signal including a plurality of first pulses corresponding to the number of cylinders, the first pulses being sequentially generated at predetermined crank angles of the cylinders;

a second signal generating means for generating within two revolutions of the crankshaft a second signal including a plurality of groups of second pulses, each group of second pulses having a pulse condition which corresponds to a specific period of the first signal and which is different from those of the other groups; and a cylinder discriminating means electrically connected to the first and second signal generating means for discriminating the operating strokes of the respective cylinders based on the first and second signals, the cylinder discriminating means being operable to perform discrimination of the cylinders by detecting a specific pulse condition of the second signal which occurred within a specific period of the first signal.

In a preferred embodiment, each of the second pulses has a rising edge and a falling edge and a pulse width less than that of each pulse of the first signal, each group of second pulses having a total sum of rising and falling edges which is different from that of each of the other groups.

Preferably, the specific period of the crank angle signal is a period in which the first signal is alternatively at a low level or at a high level.

The above and other objects, features and advantages of the present invention will become apparent from the following detailed description of a few presently preferred embodiments of the invention when taken in conjunction with the accompanying drawings.

DESCRIPTION OF THE PREFERRED EMBODIMENTS

Now, the present invention will be described in detail with reference to a few presently preferred embodiments thereof as illustrated in the accompanying drawings.

Figure 1:
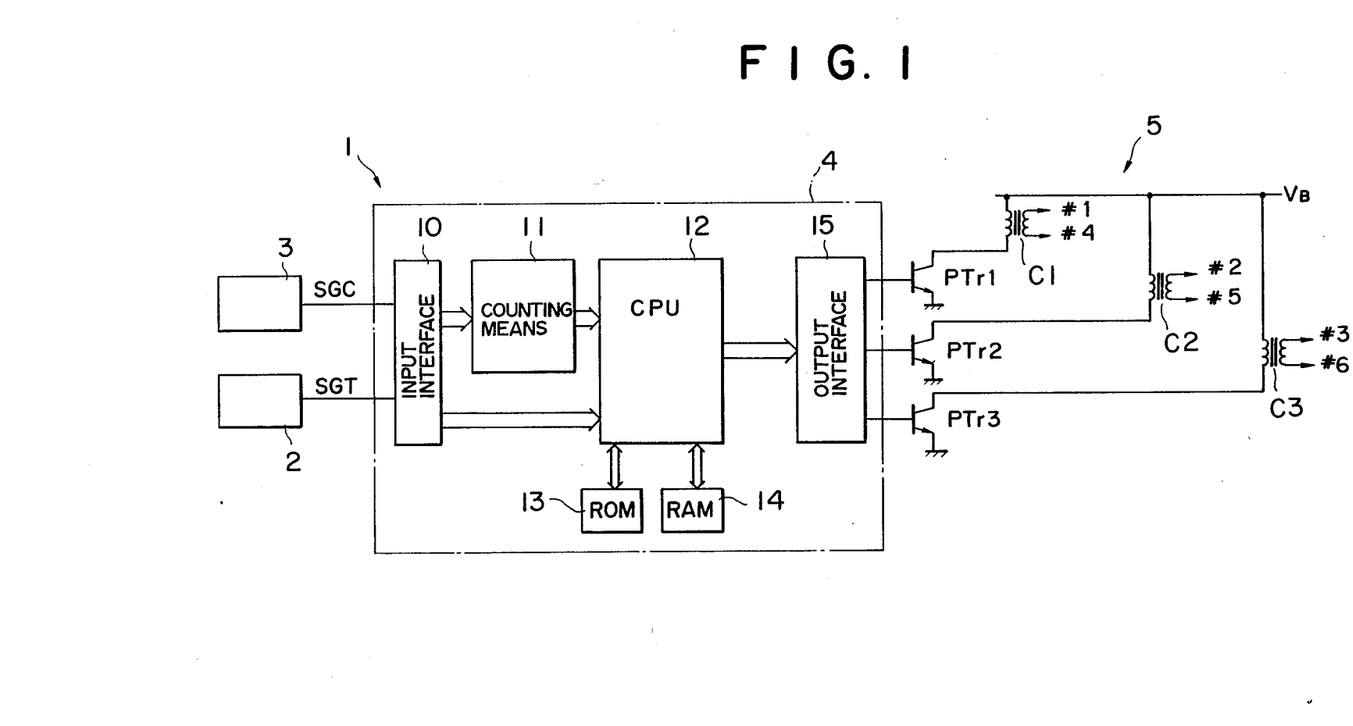
FIG. 1 is a block diagram of a control circuit of a crank angle detecting device for a multi-cylinder internal combustion engine according to the present invention.

As illustrated in FIG. 1, a crank angle detecting device for a multi-cylinder internal combustion engine in accordance with the present invention, generally designated by reference numeral 1, comprises a first signal generating means 2, a second signal generating means 3 and a cylinder discriminating means 4. The first signal generating means 2 generates, within one revolution of an unillustrated common crankshaft to which the pistons in the respective cylinders are connected, a first signal including a plurality of first pulses corresponding to the number of unillustrated cylinders of the engine, the first pulses each of the same pulse width being sequentially generated at predetermined crank angles of the cylinders. The second signal generating means 3 generates within one revolution of the camshaft (i.e., two crankshaft revolutions), a second signal including a plurality of groups of second pulses, each group of second pulses having a pulse condition which corresponds to a specific operating state of one of the cylinders and which is different from those of other groups of second pulses. The first signal generating means 2 and the second signal generating means 3 may be constituted by a single crank angle sensor. Namely, in that case, the crank angle sensor generates a first signal in the form of a crank angle signal SGT and a second signal in the form of a cylinder discrimination signal SGC.

The cylinder discriminating means 4 is electrically connected to the first and second signal generating means 2, 3 for discriminating the operating states of the respective cylinders based on the first and second signals, the cylinder discriminating means 4 being operable to perform discrimination of the cylinders by detecting a specific pulse condition of the second signal which occurred within a specific period of the first signal. The cylinder discriminating means 4 outputs electrical signals which are indicative of the thus detected operating states such as the operating strokes, crank angles, etc., of the respective cylinders and which are to be utilized for various purposes, e.g., for controlling various kinds of engine operations such as ignition timing, fuel injection timing, etc. In the embodiment as illustrated in FIG. 1, the output side of the cylinder discriminating means 4 is connected to an ignition system 5 of a multi-cylinder internal combustion engine having six cylinders #1 through #6 for controlling ignition timing for the respective cylinders. The ignition system 5 includes a first ignition coil C1 for the first and fourth cylinder #1, #4, a second ignition coil C2 for the second and fifth cylinder #2, #5, a third ignition coil C3 for the third and sixth cylinder #3, #6, and a first through a third power transistor PTr1, PTr2 and PTr3 electrically connected to the cylinder discriminating means 4 for driving the first through third coils C1-C3, respectively.

Figure 3:
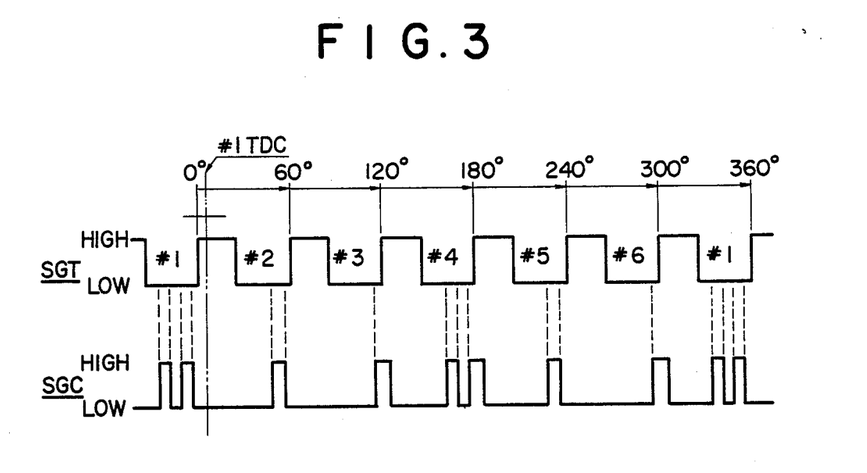
FIG. 3 is a waveform diagram of a first example of first and second signals according to the present invention, in which (A) represents a crank angle signal SGT and (B) a cylinder discrimination signal SGC.

Turning back to the first and second signal generating means 2 and 3, FIGS. 3 illustrates an example of the first and second signals SGT and SGC generated by the first and second signal generating means 2 and 3, respectively, in accordance with the present invention. This example is for a six-cylinder internal combustion engine including a first to a sixth cylinder #1 through #6. The first signal SGT generated by the first signal generating means 2 includes six pulses each in the form of a rectangle within one revolution of the camshaft. These first pulses have the same pulse width and correspond to the number of cylinders. The first pulses are sequentially generated at predetermined crank angles of the crankshaft, i.e., in this example, at equal angular intervals of 60 degrees. That is, the first signal changes from a low level into a high level at crank angles of 0, 60, 120, 180, 240 and 300 degrees. On the other hand, the second signal SGC includes, in this example, four distinct groups of second pulses within one revolution of the camshaft (two crankshaft revolutions) each of the second pulses having a pulse width less than that of the first pulses. More specifically, the second signal SGC comprise the first to fourth group respectively corresponding to specific operating states of the respective cylinders. The first group includes a total of four rising and falling edges which occur within a specific period of the first signal, i.e., during the time when the first signal is at a low level; the second group includes two rising and falling edges in total; the third group includes one rising or falling edge in total; the fourth group includes three rising and falling edges in total. Thus, each group of second pulses has a total sum of rising and falling edges which is different from those of the other groups.

Referring to FIG. 1, the cylinder discriminating means 4 comprises an input interface 10 which receives the output signals SGT and SGC from the first and second signal generating means 2, 3, a counter means 11 for counting the total sum of rising and falling edges of the second pulses of the second signal SGC which occurred when the first signal is at a low level, a central processing unit (hereinafter referred to as a CPU) 12 for discriminating the operating states or strokes of the respective cylinders, a read only memory 13 electrically connected with the CPU 12 for storing basic information and programs which are executed by the CPU 12, a random access memory 14 electrically connected with the CPU 12 for storing temporary data or results of calculations performed by the CPU 12, and an output interface 15 electrically connected with the CPU 12 for sending out the output of the CPU 12 to external devices which require the information obtained by the CPU 12. In the illustrated embodiment, the output interface 15 is connected with the ignition system 5 for a six-cylinder internal combustion engine. The CPU 12 has a first through a fourth port P0 through P3 connected to receive the output of the counter means 11, and a fifth port P4 for resetting the counter means 4, a sixth port P5 for outputting to the counter means 4 a signal which is the inverse of the first signal SGT, and a seventh port P6 connected through the input interface 10 to the second signal generating means 3.

Figure 2:
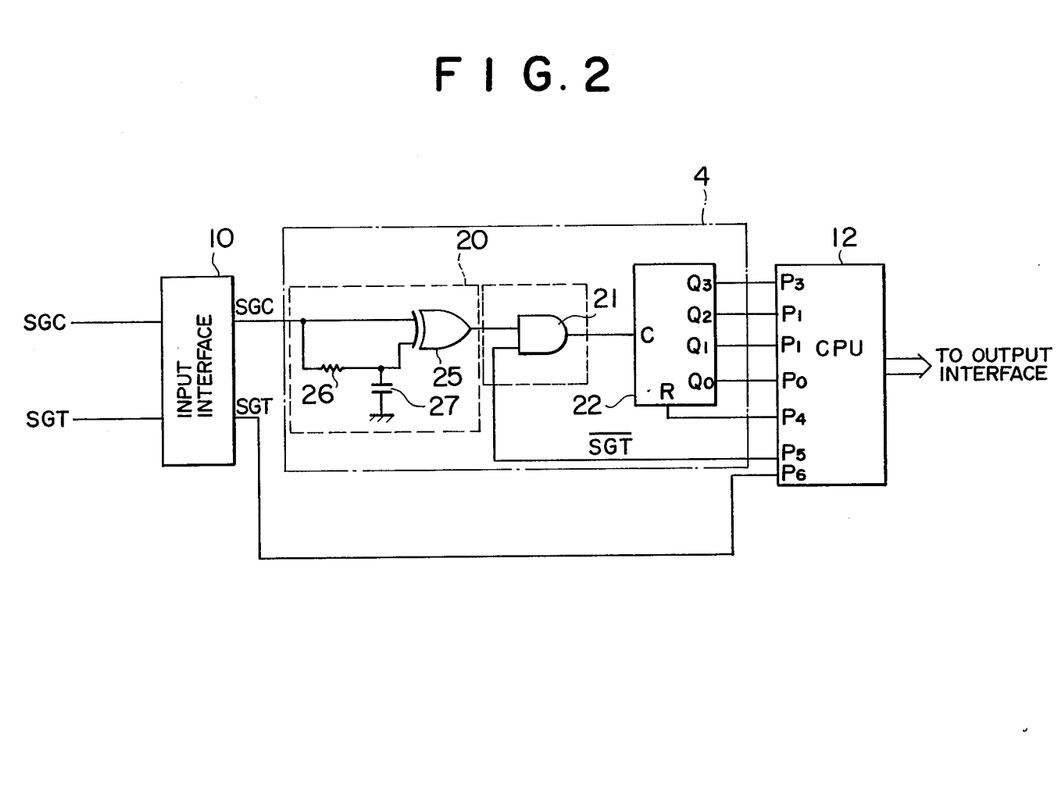
FIG. 2 is a circuit diagram of a cylinder discriminating means as shown in FIG. 1.

As specifically shown in FIG. 2, the counter means 4 comprises an edge detecting circuit 20, an AND gate 21 and a counter 22. The edge detecting circuit 20 comprises an exclusive OR gate 25 having a first one of its two input terminals connected through the input interface 10 to the first signal generating means 2 and the other second input terminal connected through a resistor 26 to an intermediate point between the input interface 10 and the first input terminal with an intermediate point between the resistor 26 and the second input terminal being grounded through a capacitor 27, so that the output terminal of the exclusive OR gate 25 becomes high each time the SGC signal changes from a low level to a high level or vice versa. The AND gate 21 has a first one of its two input terminals connected with the output terminal of the exclusive OR gate 25 and the other second terminal connected to the sixth port P5 of the CPU 12 so that the output of the AND gate 21 becomes high when the output of the exclusive OR gate 25 and the output level at the sixth port P5, which is the inverse of the SGT signal, are both high. The counter 22 has a clock terminal C connected with the output terminal of the AND gate 21, a reset terminal R connected to the fifth port P4 of the CPU 12, and a first through a fourth output terminal Q0 through Q3 which are connected to the first through fourth input port P0 through P3, respectively, of the CPU 12. The output level at the fifth port P4 of the CPU 12 becomes high each time the SGT signal changes from a low level to a high level so that the counter 22 is accordingly reset. Thus, the counter 22 serves to count how many times the output of the AND gate 21 has changed while the SGT signal is at the low level, and deliver an output signal of a high level from one of the output terminals Q0 through Q3 which corresponds to the counted number of times. For example, the first and fourth output terminal Q0 through Q3 correspond to 1, 2, 3 and 4, respectively.

Figure 4:
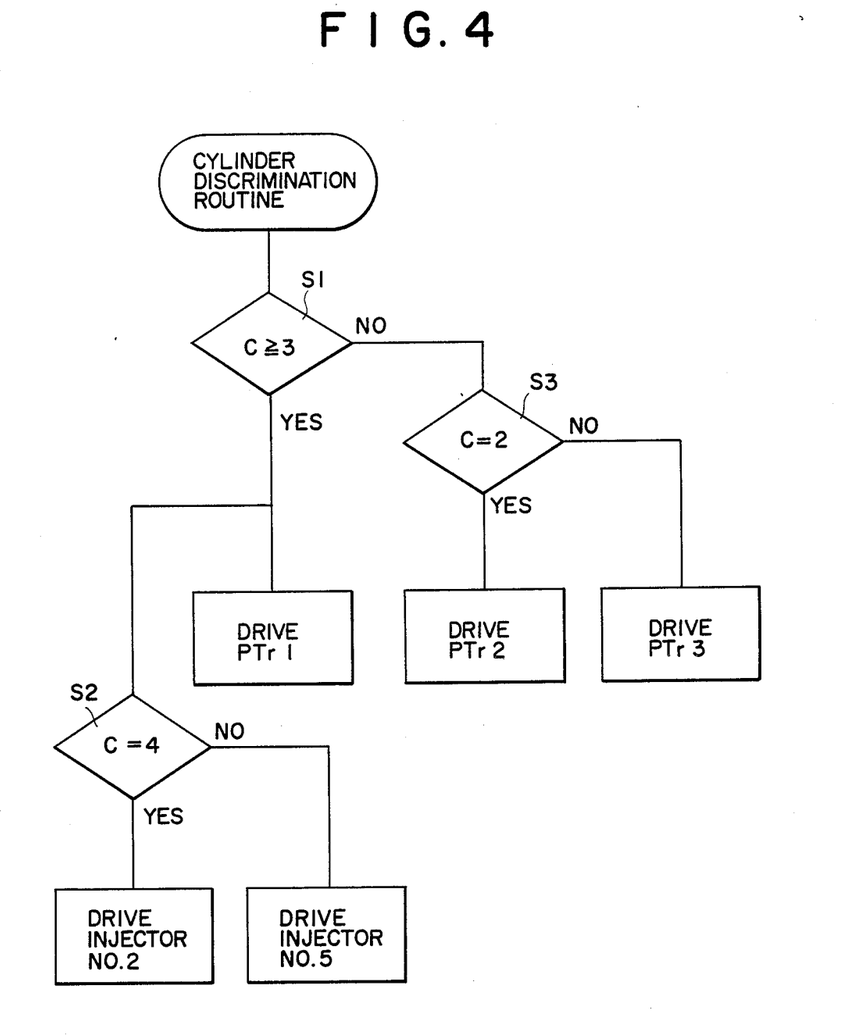
FIG. 4 is a flow chart illustrating the operation of the crank angle detecting device of FIG. 1.

The output signals of the output terminals Q0 through Q3 of the counter 22 are fed to the corresponding input ports P0 through P3, respectively, of the CPU 12 wherein discrimination of the respective cylinders is performed in accordance with a cylinder discrimination routine of a control program loaded from the ROM 13 into the CPU 12 or otherwise stored therein. One example of such a cylinder discrimination routine is shown in FIG. 4.

Now, it will be described how the operating states of the respective cylinders are discriminated while referring to FIG. 4. At first in Step S1, it is determined whether or not number C, which is outputted from the counter 22 to the CPU 12 and representative of a total sum of rising and falling edges of the SGC signal within a period in which the SGT signal is at the low level, is not less than 3. If C>3, it is recognized that the first and fourth cylinder #1, #4 are either on the compression stroke and the exhaust stroke, respectively, or vice versa, and the first power transistor PTr1 of the ignition system 5 is driven to energize the first ignition coil C1 for firing the air-fuel mixture in either the first or fourth cylinder #1, #4. In this case, dead firing in the cylinder which is on the exhaust stroke is of course useless. At the same time, the control program proceeds from Step S1 to Step S2 where it is further determined whether or not C is equal to 4. If "YES", it is recognized that the first cylinder #1 is on the compression stroke. Accordingly, the respective operating strokes of the remaining cylinders can be recognized because of predetermined firing order. Thus, in this case, it is recognized that the second cylinder #2 is on the exhaust stroke so that an illustrated fuel injection system is operated to drive an unillustrated second injector for fuel supply to the second cylinder #2. If Step S2 is determined to be "NO" (i.e., C=3), then it is recognized that the fourth cylinder #4 is on the compression stroke, and an unillustrated fifth injector is driven to supply fuel to the fifth cylinder #5. In this connection, it is to be noted that once the operating state of the first or fourth cylinder #1 or #4 is recognized in Step S2, all the remaining injectors for the respective cylinders can be driven in a predetermined sequence to accordingly supply fuel to the cylinders.

On the other hand, if it is determined C<3 in Step S1, the control program proceeds to Step S3 wherein it is determined whether or not C is equal to 2. If it is "YES", it is recognized that the second and the fifth cylinder #2, #5 are either on the compression stroke and the exhaust stroke, respectively, or vice versa, and the second power transistor PTr2 of the ignition system 5 is driven to energize the second ignition coil C2 for the second and the fifth cylinder #2, #5. If, however, it is "NO" in Step S3, it is then recognized that the third and the sixth cylinder #3, #6 are either on the compression stroke and the exhaust stroke, respectively, or vice versa. Accordingly, in this case, the third power transistor PTr3 is driven to energize the third ignition coil C3 for the third and the sixth cylinder #3, #6.

In this embodiment, if C<3 in Step S1, it is not possible to exactly determine, in Steps S3 and S4, which one of the paired cylinders is on the compression or exhaust stroke, and it is necessary to wait until C becomes equal to or larger than 3. However, this embodiment is mainly for controlling the ignition system 5 for a six-cylinder engine in which six cylinders are grouped into three pairs so that two cylinders in each pair are always ignited at the same time. Thus, to this end, it is sufficient to recognize specific operating states of any one of three cylinder pairs, and such a recognition can be carried out with a camshaft revolution of about 60 degrees (i.e., 120 degrees crank angle). However, if necessary for some other purposes, the second signal SGC may comprise six distinct groups of second pulses each of which corresponds to a specific operating stroke of each cylinder for immediately and exactly discriminating the operating strokes of the individual cylinders.

Figure 5:
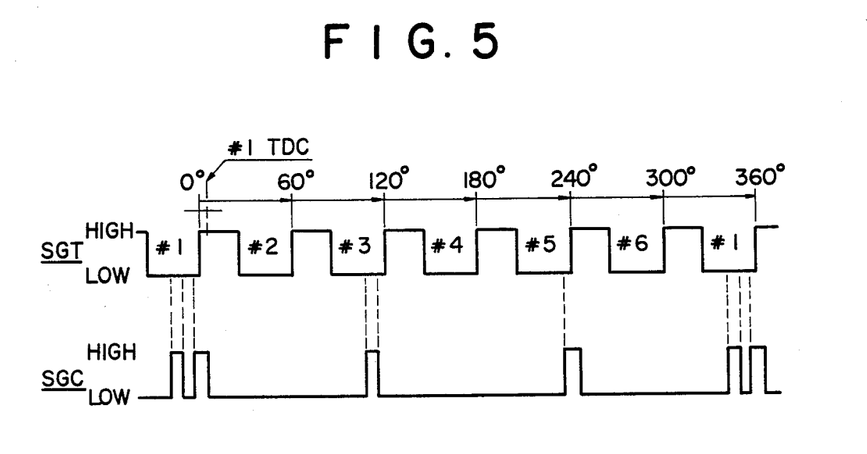
FIG. 5 is a view similar to FIG. 3, but showing a second example of first and second signals according to the present invention.

FIG. 5 is another example of the first and second signals SGT and SGC for use with a six-cylinder engine in which only the second signal SGC is different from that of FIG. 3 with the first signal SGT being the same as that shown in FIG. 3. Specifically, the second signal SGC of this embodiment comprises three distinct groups of second pulses. A first one of these groups corresponds to a specific operating state (e.g., compression stroke) of the first cylinder #1 and has a total of three rising and falling edges which occur within a specific period of the first signal SGT in which the first signal SGT is at the low level; a second group corresponds to a specific operating state (e.g., compression stroke) of the third cylinder #3 and has a total of two rising and falling edges which occur when the first signal SGT is at the low level; and a third group corresponds to a specific operating state (e.g., compression stroke) of the fifth cylinder #5 and has a total of one rising or falling edge which occurs when the first signal SGT is at the low level. Thus, according to this embodiment, a specific operating state of one of the odd numbered cylinders #1, #3 and #5 are first recognized and then the respective operating states of the remaining cylinders are recognized on the basis of the first recognized cylinder. In this case, recognition of the cylinder operating states is carried out with a maximum camshaft rotation of about 120 degrees (i.e., 240 degrees crank angle).

Figure 6:
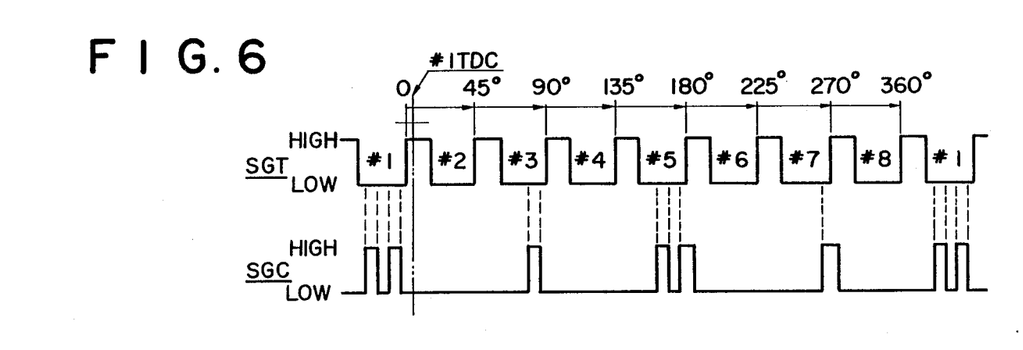
FIG. 6 is a view similar to FIG. 3, but showing a third example of first and second signals according to the present invention.

FIG. 6 shows a further example of the first and second signals SGT and SGC for use with an eight-cylinder engine. In this example, the first signal SGT includes eight pulses within one revolution of the camshaft respectively corresponding to specific operating states (e.g., compression stroke) of the respective cylinders #1 through #8, and the second signal SGC comprises four distinct groups of second pulses within one camshaft revolution. A first one of these groups corresponds to a specific operating state (e.g., compression stroke) of the first cylinder #1 and has a total of four rising and falling edges within a specific period of the first signal SGT in which the first signal SGT is at the low level; a second group corresponds to a specific operating state (e.g., compression stroke) of the third cylinder #3 and has a total of two rising and falling edges which occur while the first signal SGT is at the low level; a third group corresponds to a specific operating state (e.g., compression stroke) of the fifth cylinder #5 and has a total of three rising and falling edges which occur while the first signal SGT is at the low level; and a fourth group corresponds to a specific operating state (e.g. compression stroke) of the seventh cylinder #7 and has one rising or falling edge in total which occurs while the first signal SGT is at the low level. In this example, a specific operating state (e.g., compression stroke) of any one of the odd numbered cylinders #1, #3, #5 and #7 is first recognized and the individual operating states of the remaining cylinders are subsequently determined based on the first recognized cylinder. Thus, according to this embodiment, the respective operating states of the cylinders #1 through #8 can be recognized with a maximum camshaft revolution of about 90 degrees (i.e., 180 degrees crankshaft revolution).

Although in the examples shown in FIGS. 5 and 6, the groups of second pulses of the second signal SGC correspond to the specific operating strokes of odd-numbered cylinders, they may instead correspond to the specific operating strokes of even-numbered cylinders, or the second signal SGC may comprise a plurality of groups of second pulses which correspond in number to the cylinders, each group corresponding to a specific operating stroke of each of the cylinders.

In the foregoing description, the rising and falling edges of second pulses are counted during the time when the first signal SGT is at the low level, but they may be counted when the first signal SGT is at the high level.

What is claimed is:

1. A crank angle detecting device for a multi-cylinder internal combustion engine for detecting operating states of respective cylinders having a common crankshaft comprising:

a first signal generating means for generating within two revolutions of the crankshaft a first signal including a plurality of first pulses corresponding to the number of cylinders, said first pulses being sequentially generated at predetermined crank angles of said cylinders;

a second signal generating means for generating within two revolutions of said crankshaft a second signal including a plurality of groups of second pulses, each group of second pulses having a pulse condition which corresponds to a specific period of said first signal and which is different from that of each of the other groups; and a cylinder discriminating means electrically connected to said first and second signal generating means for discriminating the operating strokes of the respective cylinders based on said first and second signals, said cylinder discriminating means being operable to perform discrimination of the cylinders by detecting a specific pulse condition of said second signal which occurred within a specific period of said first signal.

2. A crank angle detecting device as claimed in claim 1, wherein each of said second pulses has a rising edge and a falling edge and a pulse width less than that of each pulse of said first signal, each group of second pulses having a total sum of rising and falling edges which is different from those of other groups.

3. A crank angle detecting device as claimed in claim 1, wherein said specific period of said crank angle signal is a period in which said first signal is at a low level.

4. A crank angle detecting device as claimed in claim 1, wherein said specific period of said crank angle signal is a period in which said first signal is at a high level.

5. A crank angle detecting device as claimed in claim 1, wherein said first pulses of said first signal are of rectangular wave form.

6. A crank angle detecting device as claimed in claim 5, wherein said second pulses of said second signal are of rectangular wave form.

7. A crank angle detecting device as claimed in claim 6, wherein the number of said cylinders is eight, and the first pulses of said first signal are generated at intervals of 90 degrees crank angle.

8. A crank angle detecting device as claimed in claim 7, wherein said second signal includes four different kinds of pulses which are generated at intervals of 180 degrees crank angle.

9. A crank angle detecting device as claimed in claim 1, wherein the number of said cylinders is six, and the first pulses of said first signal are generated at intervals of 120 degrees crank angle.

10. A crank angle detecting device as claimed in claim 9, wherein said second signal includes three different kinds of pulses which are generated at intervals of 240 degrees crank angle.

11. A crank angle detecting device as claimed in claim 9, wherein said second signal includes four different kinds of pulses which are generated at intervals of 120 degrees crank angle.

* * * * *